(12) United States Patent
Chidambara et al.

(10) Patent No.: US 11,677,494 B2
(45) Date of Patent: Jun. 13, 2023

(54) ENHANCED ERROR PROTECTION OF PAYLOAD USING DOUBLE CRC

(71) Applicant: Avago Technologies International Sales Pte. Limited, Singapore (SG)

(72) Inventors: Sundararajan Chidambara, Austin, TX (US); Sameer Kanhaiyalal Shah, Austin, TX (US); Nishant Chadha, San Jose, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 17/152,677

(22) Filed: Jan. 19, 2021

(65) Prior Publication Data

US 2022/0231783 A1 Jul. 21, 2022

(51) Int. Cl.
*H04L 9/40* (2022.01)
*H04L 1/00* (2006.01)
*H04L 101/622* (2022.01)

(52) U.S. Cl.
CPC .......... *H04L 1/0041* (2013.01); *H04L 1/0045* (2013.01); *H04L 1/0061* (2013.01); *H04L 1/0091* (2013.01); *H04L 63/0435* (2013.01); *H04L 63/164* (2013.01); *H04L 2101/622* (2022.05)

(58) Field of Classification Search
CPC ... H04L 1/0041; H04L 1/0045; H04L 1/0061; H04L 1/0091; H04L 61/6022; H04L 63/0435; H04L 63/164; H04L 2101/622; H04L 63/0428; H04L 63/123; H04L 2001/0096
USPC ...................................................... 714/776
See application file for complete search history.

(56) References Cited

U.S. PATENT DOCUMENTS

| | | | | |
|---|---|---|---|---|
| 6,701,478 B1 * | 3/2004 | Yang | ................... | H03M 13/091 714/776 |
| 6,931,581 B1 * | 8/2005 | Cassiday | ............... | H04L 1/0041 714/776 |
| 2003/0058862 A1 * | 3/2003 | Lansing | ............... | H04N 21/437 348/E7.071 |
| 2004/0066271 A1 * | 4/2004 | Leek | ...................... | G08C 17/02 340/3.1 |
| 2006/0039468 A1 * | 2/2006 | Emerson | ............. | G06F 11/2294 375/240.24 |

(Continued)

FOREIGN PATENT DOCUMENTS

| | | | |
|---|---|---|---|
| EP | 1928127 | 6/2008 | |
| KR | 2007003444 A * | 1/2007 | |
| WO | WO-2021080120 A1 * | 4/2021 | ............. H04W 4/40 |

OTHER PUBLICATIONS

European Office Action from European Patent Application No. 22150964.9, dated Jun. 28, 2022, 8 pages.

*Primary Examiner* — Albert Decady
*Assistant Examiner* — Enam Ahmed
(74) *Attorney, Agent, or Firm* — Foley & Lardner LLP (57) ABSTRACT

A method for enhanced error protection using double-cyclic redundancy check (CRC) includes receiving a first packet, by a first physical layer (PHY). The first packet includes a source packet and a first CRC. The method also includes encrypting the first packet having the first CRC to generate an encrypted first packet. The method further includes appending a second CRC to the encrypted first packet to produce a second packet, and transmitting the second packet to a second PHY via a transmission line.

20 Claims, 6 Drawing Sheets

(56) References Cited

U.S. PATENT DOCUMENTS

| | | | | |
|---|---|---|---|---|
| 2007/0297451 A1* | 12/2007 | Kim | ............... | H04L 1/0083 |
| | | | | 370/469 |
| 2008/0075073 A1* | 3/2008 | Swartz | ............. | H04L 63/162 |
| | | | | 370/389 |
| 2009/0210770 A1* | 8/2009 | DeCusatis | ........... | H04L 1/004 |
| | | | | 714/776 |
| 2015/0046775 A1* | 2/2015 | Prodan | ............. | H03M 13/09 |
| | | | | 714/776 |
| 2015/0171894 A1* | 6/2015 | Choi | ............... | H04L 1/0042 |
| | | | | 714/776 |
| 2016/0020869 A1* | 1/2016 | Oh | ................. | H04H 40/18 |
| | | | | 714/776 |
| 2018/0026748 A1* | 1/2018 | Jo | ................. | H04L 1/0061 |
| | | | | 714/776 |
| 2020/0196153 A1* | 6/2020 | Agarwal | ........... | H04L 1/1845 |
| 2020/0252162 A1* | 8/2020 | Denboer | ............ | H04L 1/189 |
| 2021/0160009 A1* | 5/2021 | Goyal | ............... | H04L 63/04 |
| 2022/0045696 A1* | 2/2022 | Boussard | ........... | H03M 13/15 |

\* cited by examiner

ENHANCED ERROR PROTECTION OF PAYLOAD USING DOUBLE CRC

TECHNICAL FIELD

The present description relates generally to communication systems and, in particular, to an enhanced error protection of a payload using double-cyclic redundancy check (CRC).

BACKGROUND

A cyclic redundancy check (CRC) is an error-detecting code commonly used to detect accidental changes to raw digital data communicated in digital networks and storage devices. The changes to raw digital data are in the form of bit flips. Blocks of digital data entering these systems are provided with a short error-check value attached to each packet of data. The CRC value is calculated based on the remainder of a polynomial division of the data content of the packet. Upon retrieval, the calculation is repeated and, in the event that the CRC value in the entered data packet does not match the CRC values in the output packet, corrective action can be taken against data corruption based on the CRC value.

CRCs are so called because the check (data verification) value is a redundancy (it expands the message without adding information) and the applied algorithm is based on cyclic codes. The popularity of the CRCs arise from their simple implementation in digital hardware, rather easy mathematical analysis, and particularly good detection of common errors caused by noise in transmission channels. Because the check value has a fixed length, the function that generates it is occasionally used as a hash function. The existing CRC error-detection methods have shortcomings that need to be addressed using an enhanced error-protection scheme.

BRIEF DESCRIPTION OF THE DRAWINGS

Certain features of the subject technology are set forth in the appended claims. However, for purposes of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute part of the detailed description, which includes specific details for providing a thorough understanding of the subject technology. However, the subject technology is not limited to the specific details set forth herein and may be practiced without one or more of the specific details. In some instances, structures and components are shown in a block-diagram form in order to avoid obscuring the concepts of the subject technology.

The subject technology is directed to methods and systems for enhanced error protection of a payload using double-cyclic redundancy check (CRC). The double CRC of the subject technology is implemented in both media-access control security (MACsec) enabled or MACsec-disabled physical layers (PHYs). The disclosed double-CRC feature allows retaining the incoming CRC instead of having it stripped. In some aspects, the egress packet with the CRC is encrypted by the MACsec, and the encrypted packet is then transmitted with a new CRC (e.g., outer CRC) via a transmit MAC. When the double-CRC packet is received on the receiver side, the outer CRC is stripped by the receiving MAC and then decrypted by the MACsec logic. The decrypted packet will have the originally received CRC. This entire packet is sent out by the transmit MAC. An advantageous feature of the double CRC of the subject technology is that the original CRC is retained from start to finish.

This feature results in detection of any silent data corruption in the data path that enables dropping the corrupted packets prior to reaching the receiving device. In the existing solutions, at the MACsec-related PHYs, any bit flips in the data path will go out of the PHY as a silent error. This is because the CRC of incoming packet is stripped at the receive MAC and then recomputed by the outgoing MAC. The recomputed CRC is on the corrupted data without being detected. The exiting solution is not foolproof and lacks reliability. The disclosed solution provides a high level of confidence that any silent corruption is detected via the PHY by generating the appropriate error condition. While the disclosed double-CRC technique can be implemented in hardware, some features of the double-CRC technique can be implemented in software or firmware.

Figure 1:
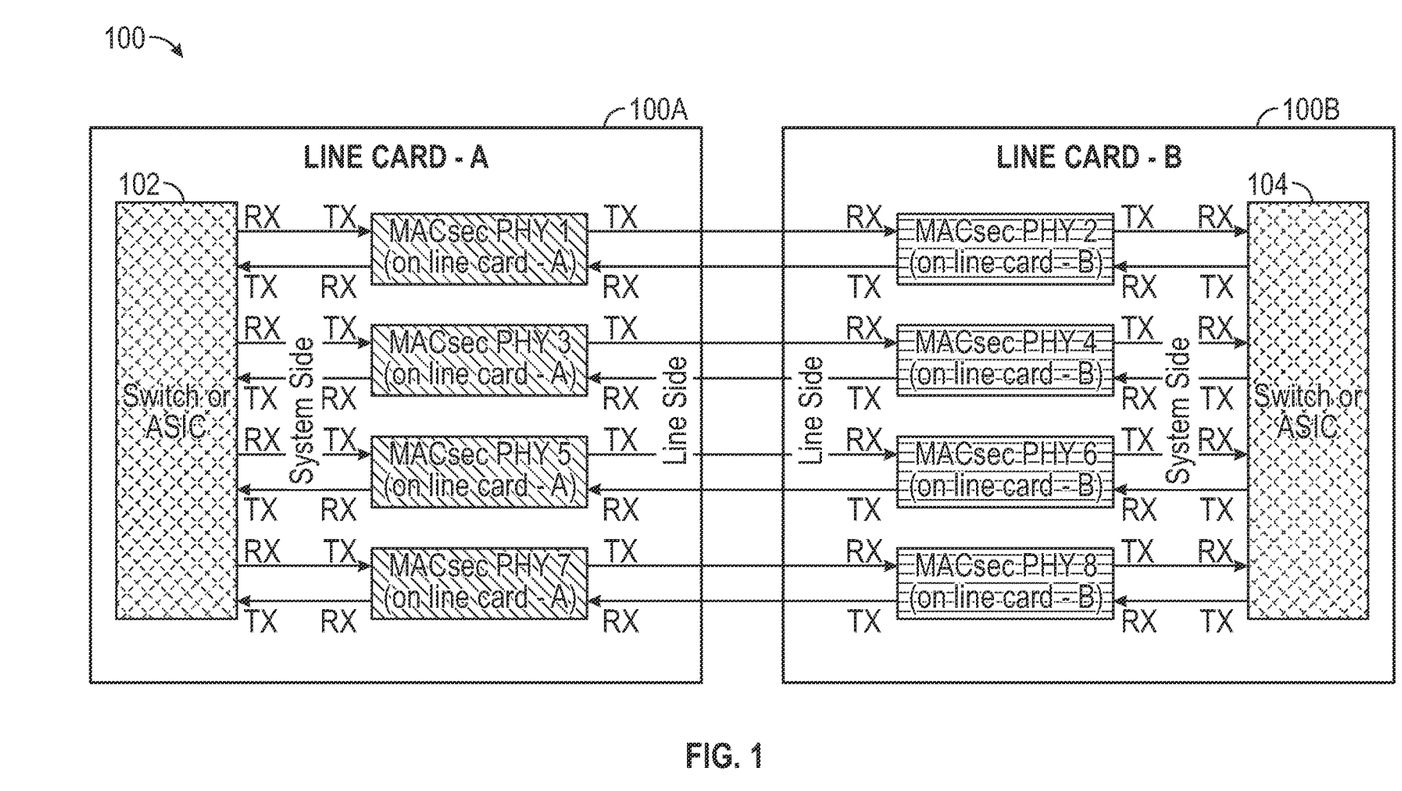
FIG. 1 is a schematic diagram illustrating an example of a high-level view of a system in which various aspects of the subject technology are implemented.

FIG. 1 is a schematic diagram illustrating an example of a high-level view of a system 100 in which various aspects of the subject technology are implemented. The system 100 includes a first line card 100A (line card-A) in communication with a second line card 100B (line card-B). The first line card 100A and the second line card 100B may be, for example, parts of a digital network or a data storage facility. The first line card 100A includes a switch 102 and a first set of MACsec PHYs such as a MACsec PHY1, a MACsec PHY3, a MACsec PHY5 and a MACsec PHY7. In some aspects of the subject technology, the switch 102 can be an application-specific integrated circuit (ASIC). In a transmit (TX) path, the switch or ASIC 102 transmits packets to the MACsec PHYs, and in a receive (RX) path, the switch or ASIC 102 receives packets from the MACsec PHYs. The first set of MACsec PHYs are parts of first MAC PHYs in which the double-CRC scheme of the subject technology is implemented, as discussed in more detail herein. Each MACsec PHY is a security MAC PHY and, when enabled, is capable of encrypting the content of a received packet.

The second line card 100B is similar to the first line card 100A and includes a second set of MACsec PHYs such as a MACsec PHY2, a MACsec PHY4, a MACsec PHY6 and a MACsec PHY8. The second set of MACsec PHYs is communicatively coupled to a switch and/or ASIC 104. The disclosed double-CRC scheme is also implemented in the second MAC PHYs that include the second set of MACsecs, as discussed in more detail herein.

Figure 2A:
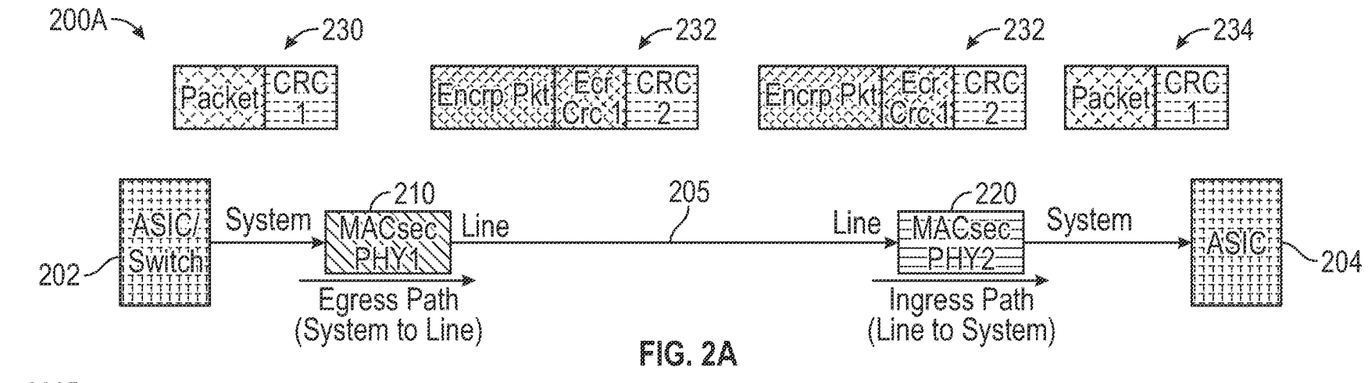
FIGS. 2A and 2B are schematic diagrams illustrating examples of double-cyclic redundancy check (CRC) implementation with a enabled media-access control security (MACsec) feature, in accordance with some aspects of the subject technology.
Figure 2B:
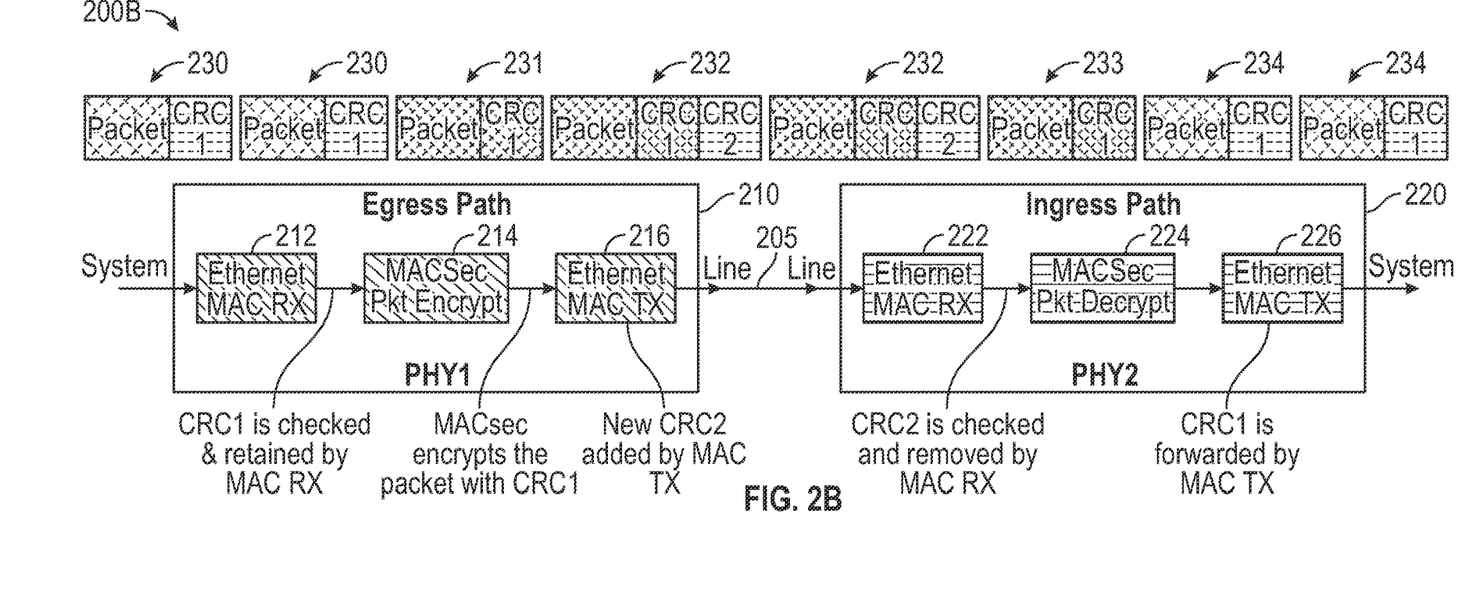

FIGS. 2A and 2B are schematic diagrams illustrating examples of double-CRC implementation, in accordance with some aspects of the subject technology. FIG. 2A shows a high-level view 200A of an example double-CRC scheme of the subject technology, which is implemented using a switch and/or ASIC 202, a MACsec block 210, a line 205, a MACsec 220 and a switch and/or ASIC 204. The switch and/or ASIC 202 and the MACsec 210 belong to the first line card 100A of FIG. 1, and the switch and/or ASIC 204 and the MACsec block 220 belong to the second line card 100B of FIG. 1. The switch and/or ASIC 202 sends a packet-plus-CRC 230 including a first CRC (CRC1) in an egress path to a MACsec block 210. The MACsec block 210 encrypts the packet-plus-CRC 230 and adds a second CRC (CRC2) to the encrypted packet-plus-CRC 230 to generate a double-CRC packet 232, which is transmitted via the line 205 to the MACsec block 220 of an ingress path. The output of the MACsec block 220 is a packet-plus-CRC 234, which is the same as the original packet-plus-CRC 230 entered in the egress path.

FIG. 2B shows a more detailed implementation 200B of the example double-CRC scheme of FIG. 2A. In the implementation 200B, the egress path is shown to consist of a PHY 210 (PHY1) that includes an Ethernet MAC TX block 212, the MACsec block 214 and an Ethernet MAC TX block 216. The ingress path of the implementation 200B is similar to the egress path and consists of a PHY 220 (PHY2) that includes an Ethernet MAC RX block 222, the MACsec block 224 and an Ethernet MAC TX block 226.

The Ethernet MAC RX block 212 receives the packet-plus-CRC 230 and checks the CRC1 to detect any error in the packet data, and, if no error is detected, the CRC1 is retained and the packet-plus-CRC 230 is passed for encryption to the MACsec block 214, where the encrypted packet-plus-CRC 231 is generated. The encrypted packet-plus-CRC 231 is sent to the Ethernet MAC TX block 216, where the second CRC (CRC2) is appended to produce the double-CRC packet 232, which is transmitted via line 205 to PHY 220. In PHY 220, the Ethernet MAC RX block 222 receives the double-CRC packet 232 and checks the CRC2 to detect whether any corruption in the packet data, and, if no corruption is detected, the CRC2 is removed and the encrypted packet-plus-CRC 233 is produced. The encrypted packet-plus-CRC 233 is similar to the encrypted packet-plus-CRC 231 and is passed for decryption to the MACsec block 224, where the decrypted packet-plus-CRC 234 is generated. The decrypted packet-plus-CRC 234 is the same as the original packet-plus-CRC 230 that was received by the first PHY 210 and can be used to detect any silent error and then is transmitted by the Ethernet MAC TX block 226. In one or more aspects, the same double-CRC scheme of FIG. 2B discussed above can be applied to the path in the opposite direction from PHY 220 to PHY 210.

It is worth noting that with the double-CRC feature of the subject technology, the incoming CRC (CRC1) from the source ASIC/switch is retained, and because this CRC is retained through the entire egress and ingress data path, the destination MAC in the destination switch/ASIC will be able to identify any data bit corruption that would otherwise pass unnoticed through the system.

Figure 3A:
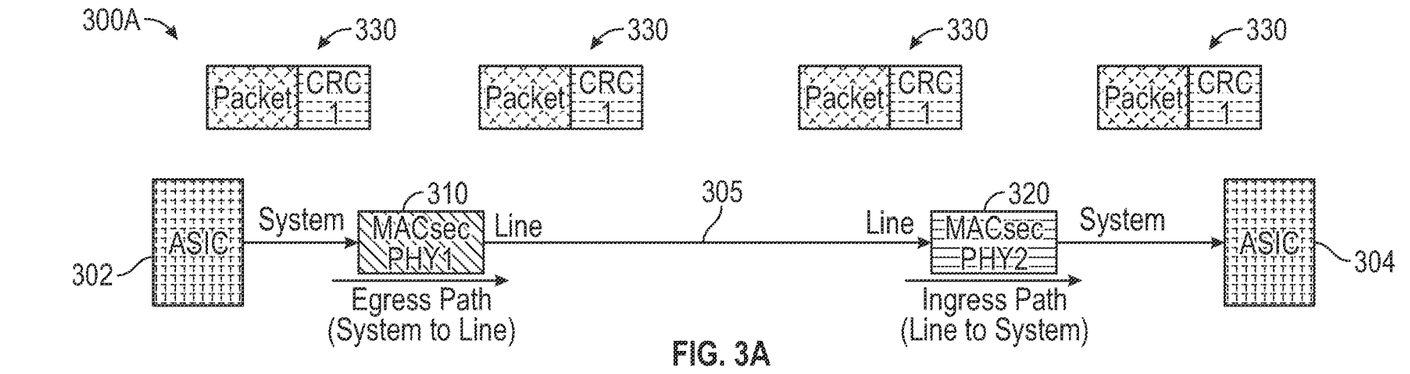
FIGS. 3A and 3B are schematic diagrams illustrating examples of double-CRC implementation with a disabled media-access control security (MACsec) feature, in accordance with some aspects of the subject technology.
Figure 3B:
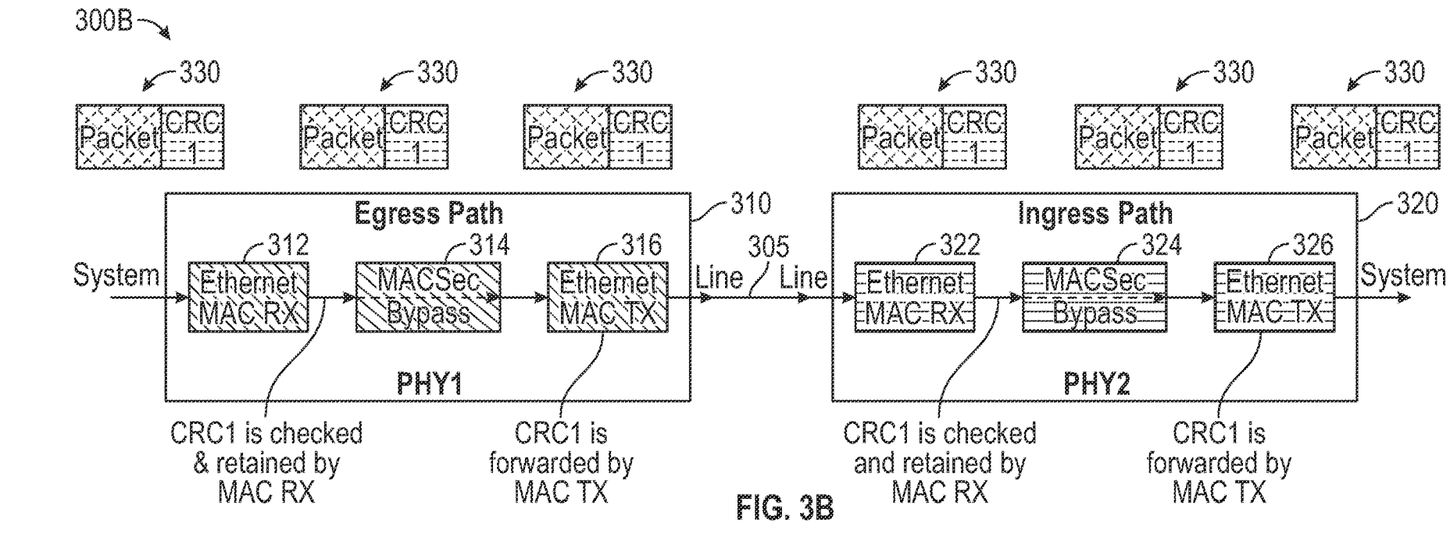

FIGS. 3A and 3B are schematic diagrams illustrating examples of CRC-pass through implementation with a disabled MACsec feature, in accordance with some aspects of the subject technology. FIG. 3A shows a high-level view 300A of an example CRC-pass-through scheme of the subject technology, where the MACsec feature is disabled. The example double-CRC scheme of FIG. 3A is implemented using a switch and/or ASIC 302, a MACsec block 310, a line 305, a MACsec block 320 and a switch and/or ASIC 304. The switch and/or ASIC 302 and the MACsec block 310 belong to the first line card 100A of FIG. 1, and the switch and/or ASIC 304 and the MACsec block 320 belong to the second line card 100B of FIG. 1. The switch and/or ASIC 302 sends a packet-plus-CRC 330 including a first CRC (CRC1) in an egress path to a MACsec block 310. The MACsec block 310 is programmed to forward the packet-plus-CRC 330 without appending a second CRC (CRC2) to the encrypted packet-plus-CRC 330 or encrypting it. Therefore, the packet-plus-CRC 330 is transmitted via the line 305 to the MACsec block 320, which in turn is programmed to not append or replace the CRC in the received the packet-plus-CRC. Thus, the output of the MACsec block 320 is the same as the original packet-plus-CRC 330 entered in the egress path.

FIG. 3B shows a more detailed implementation 300B of the example double-CRC scheme of FIG. 3A. In the implementation 300B, the egress path consists of a PHY 310 (PHY1) that includes an Ethernet MAC TX block 312, the MACsec block 314 and an Ethernet MAC TX block 316. The ingress path of the implementation 300B is similar to the egress path and consists of a PHY 320 (PHY2) that includes an Ethernet MAC RX block 322, the MACsec block 324 and an Ethernet MAC TX block 326.

The Ethernet MAC RX block 312 receives the packet-plus-CRC 330 and checks the CRC1 to detect any error in the packet data, and, if no error is detected, the CRC1 is retained and the packet-plus-CRC 330 is passed to the MACsec block 314, which can be programmed to be disabled. In one or more implementations, the MACsec block 314 can be entirely bypassed. Thus, the packet-plus-CRC 330 is sent to the Ethernet MAC TX block 316 unchanged. The Ethernet MAC TX block 316 is programmed to transmit, without appending, the packet-plus-CRC 330 to the PHY 320 via the line 305. In the PHY 320, the Ethernet MAC RX block 322 receives the packet-plus-CRC 330 and checks the CRC1 to detect whether any silent error occurred during transmission through the line 205 in the packet data, and, if no error is detected, the CRC1 is retained and the packet-plus-CRC 330 is passed to the MACsec block 324, which can be programmed to be disabled. In some implementations, the MACsec block 324 can be entirely bypassed. Therefore, the packet-plus-CRC 330—that is the same as the original packet-plus-CRC 230 that was received by the first PHY 310—is transmitted by the Ethernet MAC TX block 326. In one or more aspects, the same double-CRC scheme of FIG. 300B discussed above can be similarly applied to the path in the opposite direction from PHY 320 to PHY 310.

It is worth noting that the example implementation of the double-CRC scheme can be used even when the MACsec feature is disabled in the PHY 310 and the incoming CRC from the source ASIC/switch (e.g., 302) is retained. Because the original CRC is retained through the entire egress and ingress paths, the destination MAC in destination switch/ASIC (e.g., 304) is able to identify any data bit corruption that otherwise would have passed through unnoticed.

Figure 4A:
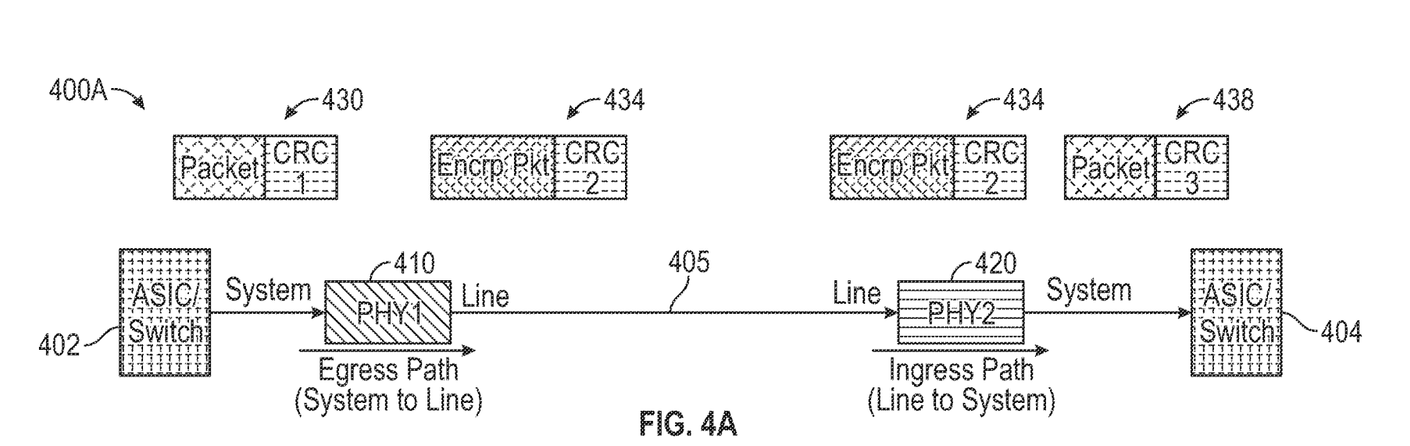
FIGS. 4A and 4B are schematic diagrams illustrating examples of existing normal CRC implementation.
Figure 4B:
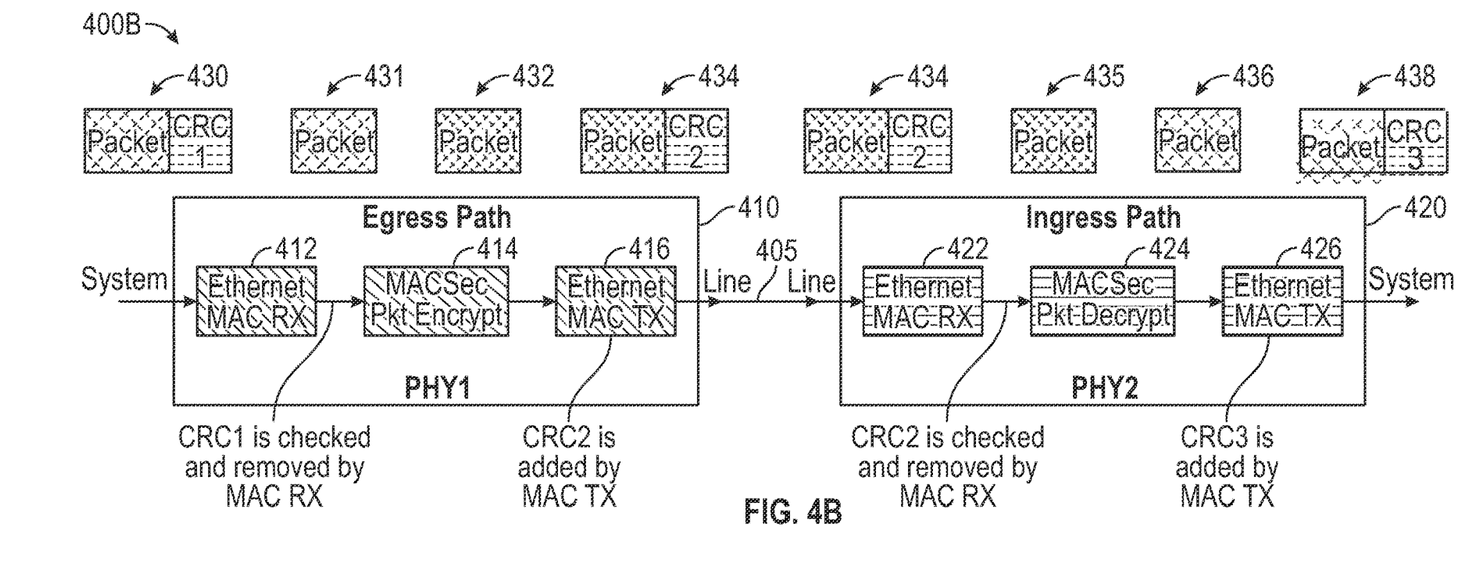

FIGS. 4A and 4B are schematic diagrams illustrating examples of existing normal CRC implementation. FIG. 4A shows a high-level view 400A of an example normal CRC scheme, which is described herein, highlighting the differences and advantageous features of the subject technology over the existing solution. The normal CRC scheme of high-level view 400A is implemented using a switch and/or ASIC 402, an egress path PHY 410 (PHY1), a line 405, an ingress PHY 420 (PHY2) and a switch and/or ASIC 404. The switch and/or ASIC 402 and the PHY 410 belong to the first line card 100A of FIG. 1, and the switch and/or ASIC 404 and the PHY 420 belong to the second line card 100B of FIG. 1. The switch and/or ASIC 402 sends a packet-plus-CRC 230 including a first CRC (CRC1) in the egress path to the PHY 410. The PHY 410 checks CRC1 and removes it and encrypts the packet and appends a new CRC (CRC2) to the encrypted packet to generate an encrypted packet-plus-CRC2 434, which is transmitted via the line 405 to the PHY 420 of the ingress path. In the PHY 420, the CRC2 is checked and removed, the packet is decrypted and a new CRC (CRC3) is appended to the decrypted packet to generate a packet-plus-CRC3 438.

FIG. 4B shows a more detailed implementation 400B of the example normal CRC scheme of FIG. 4A. In the implementation 400B, the egress path is shown to consist of the PHY 410 (PHY1) that includes an Ethernet MAC RX block 412, a MACsec block 414 and an Ethernet MAC TX block 416. The ingress path of the implementation 400B is similar to the egress path and consists of the PHY 420 (PHY2) that includes an Ethernet MAC RX block 422, a MACsec block 424 and an Ethernet MAC TX block 426.

The Ethernet MAC RX block 412 receives the packet-plus-CRC 430 and checks the CRC1 to detect any error in the packet data, and, if no error is detected, the CRC1 is removed and the packet 431 is passed for encryption to the MACsec block 414, where the encrypted packet 432 is generated. The encrypted packet 432 is sent to the Ethernet MAC TX block 216, where a new CRC (CRC2) is appended to the encrypted packet 432 to produce an encrypted packet-plus-CRC2 434, which is transmitted via the line 505 to the PHY 420. In the PHY 420, the Ethernet MAC RX block 422 receives the encrypted packet-plus-CRC2 434, checks and removes the CRC2 and produces the encrypted packet 434. The encrypted packet 434 is passed to the MACsec block 424 for decryption, where the decrypted packet 436 is generated. The decrypted packet 436 is the same as the original packet-plus-CRC 430 that was received by the first PHY 410. The decrypted packet 436 is passed to the Ethernet MAC TX block 426, where a new CRC (CRC3) is appended to the packet to generate a packet-plus-CRC3 438, which can be transmitted by the Ethernet MAC TX block 426. The same normal CRC scheme of FIG. 4B discussed above can be applied to the path in the opposite direction from PHY 420 to PHY 410.

According to the above description, in the existing CRC scheme, if there is any data corruption such as a data bit flip due to a memory corruption inside the PHYs (e.g., PHY 410 and PHY 420), it can slip through as silent corruption, which the regular Ethernet CRC is not capable of capturing. This is because the CRC is recomputed by the transmit MAC (e.g., the Ethernet MAC TX block 426), as described above.

Figure 5:
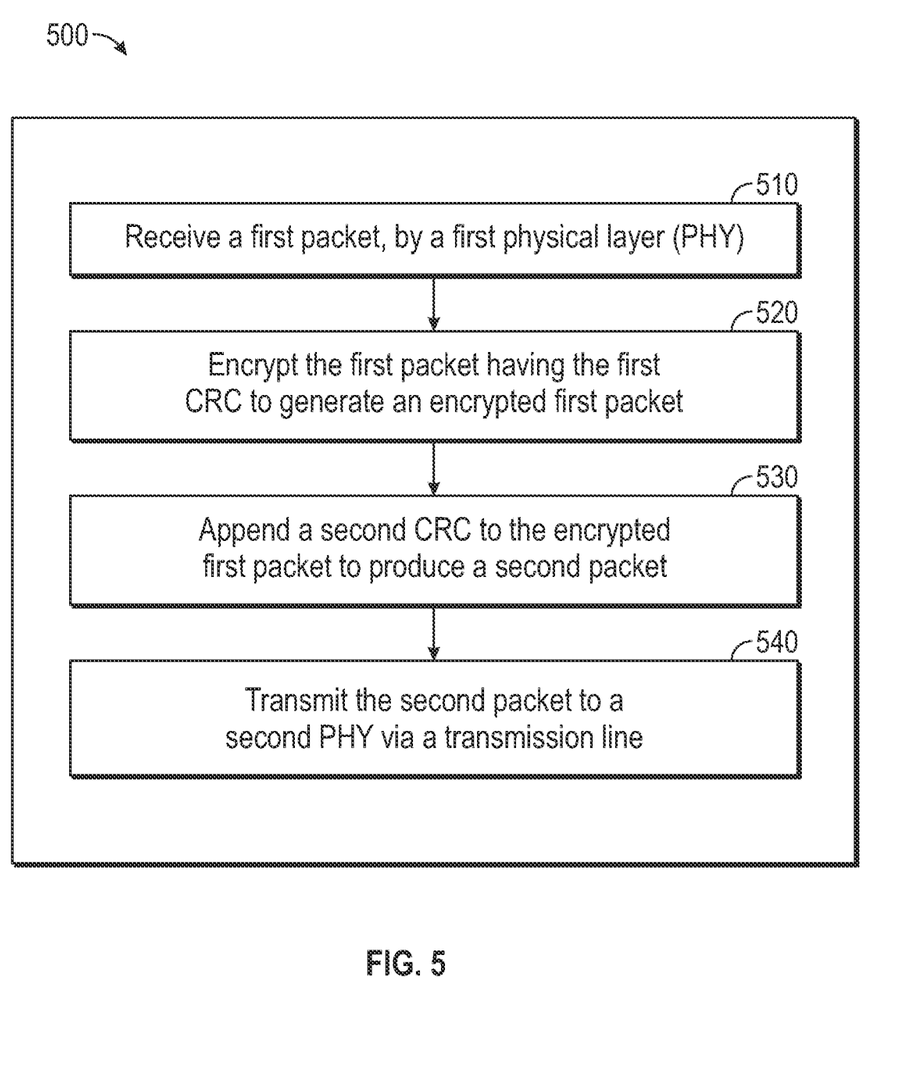
FIG. 5 is a flow diagram illustrating an example process of double-CRC implementation, in accordance with some aspects of the subject technology.

FIG. 5 is a flow diagram illustrating an example process 500 for double-CRC implementation, in accordance with some aspects of the subject technology. The process 500 includes receiving a first packet (e.g., 230 of FIG. 2B) by a first PHY (e.g., 210 of FIG. 2B) (510). The first packet includes a source packet (e.g., the packet in FIG. 2B) and a first CRC (e.g., CRC1 of FIG. 2B). The process 500 also includes encrypting (e.g., by 214 of FIG. 2B) the first packet having the first CRC to generate an encrypted first packet (e.g., 231 of FIG. 2B) (520). The process 500 further includes appending a second CRC (e.g., CRC2 of FIG. 2B) to the encrypted first packet to produce a second packet (e.g., 232 of FIG. 2B) (530), and transmitting the second packet to a second PHY (e.g., 220 of FIG. 2B) via a transmission line (e.g., 205 of FIG. 2B) (540).

Figure 6:
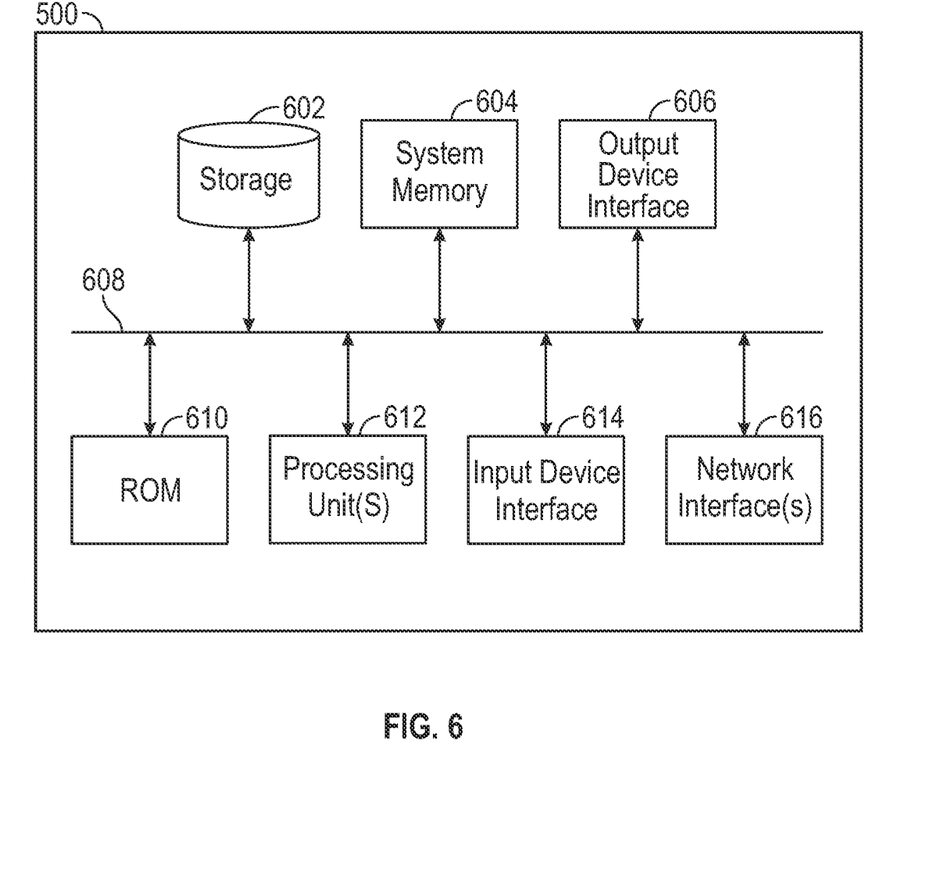
FIG. 6 is an electronic system within which some aspects of the subject technology are implemented.

FIG. 6 is an electronic system within which some aspects of the subject technology are implemented. The electronic system 600 can be, and/or can be a part of, the network switch (e.g., 102 or 104 of FIG. 1) of a data center or an enterprise network. The electronic system 600 may include various types of computer-readable media and interfaces for various other types of computer-readable media. The electronic system 600 includes a bus 608, one or more processing units 612, a system memory 604 (and/or buffer), a ROM 610, a permanent storage device 602, an input device interface 614, an output device interface 606, and one or more network interfaces 616, or subsets and variations thereof.

The bus 608 collectively represents all system, peripheral, and chipset buses that communicatively connect the numerous internal devices of the electronic system 600. In one or more implementations, the bus 608 communicatively connects the one or more processing unit(s) 612 with the ROM 610, the system memory 604, and the permanent storage device 602. From these various memory units, the one or more processing unit(s) 612 retrieves instructions to execute and data to process in order to execute the processes of the subject disclosure. The one or more processing units 612 can be a single processor or a multi-core processor in different implementations.

The ROM 610 stores static data and instructions that are needed by the one or more processing units 612 and other modules of the electronic system 600. The permanent storage device 602, on the other hand, may be a read-and-write memory device. The permanent storage device 602 may be a nonvolatile memory unit that stores instructions and data, even when the electronic system 600 is off. In one or more implementations, a mass-storage device (such as a magnetic or optical disk and its corresponding disk drive) may be used as the permanent storage device 602.

In one or more implementations, a removable storage device (such as a floppy disk or flash drive and its corresponding disk drive) may be used as the permanent storage device 602. Similar to the permanent storage device 602, the system memory 604 may be a read-and-write memory device. However, unlike the permanent storage device 602, the system memory 604 may be a volatile read-and-write memory, such as random-access memory (RAM). The system memory 604 may store any of the instructions and data that one or more processing units 612 may need at runtime. In one or more implementations, the processes of the subject disclosure are stored in the system memory 604, the permanent storage device 602, and/or the ROM 610. From these various memory units, the one or more processing units 612 retrieves instructions to execute and data to process in order to execute the processes of one or more implementations.

The bus 608 also connects to the input and output device interfaces 614 and 606. The input device interface 614 enables a user to communicate information and select commands to the electronic system 600. Input devices that may be used with the input device interface 614 may include, for example, alphanumeric keyboards and pointing devices (also called "cursor control devices"). The output device interface 606 may enable, for example, the display of images generated by electronic system 600. Output devices that may be used with the output device interface 606 may include, for example, printers and display devices such as a liquid crystal display (LCD), a light-emitting diode (LED) display, an organic light-emitting diode (OLED) display, a flexible display, a flat-panel display, a solid-state display, a projector, or any other device for outputting information. One or more implementations may include devices that function as both input and output devices, such as touchscreens. In these implementations, feedback provided to the user can be any form of sensory feedback such as visual feedback, auditory feedback, or tactile feedback; and input from the user can be received in any form, including acoustic, speech, or tactile input.

Finally, as shown in FIG. 6, the bus 608 also couples the electronic system 600 to one or more networks and/or to one or more network nodes, through the one or more network interfaces 616. In this manner, the electronic system 600 can be a part of a network of computers (such as a LAN, or a wide-area network ("WAN")), or an Intranet, or a network of networks such as the Internet. Any or all components of the electronic system 600 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be nontransitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any nonsemiconductor memory such as optical disk storage, magnetic disk storage, magnetic tape, other magnetic storage devices, or any other medium capable of storing one or more instructions. In one or more implementations, the tangible computer-readable storage medium can be directly coupled to a computing device, while, in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or nonexecutable machine code or as instructions in a high-level language that can be compiled to produce executable or nonexecutable machine code. Further, instructions also can be realized as or can include data. Computer-executable instructions also can be organized in any format including routines, subroutines, programs, data structures, objects, modules, applications, applets, and functions, among other resources. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station," "receiver," "computer," "server," "processor," and "memory" all refer to electronic or other technological devices. These terms exclude people or groups of people. For the purposes of the specification, the terms "display" or "displaying" mean displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to," "operable to," and "programmed to" do not imply any particular tangible or intangible modification of a subject, but rather are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as "an aspect," "the aspect," "another aspect," "some aspects," "one or more aspects," "an implementation," "the implementation," "another implementation," "some implementations," "one or more implementations," "an embodiment," "the embodiment," "another embodiment," "some embodiments," "one or more embodiments," "a configuration," "the configuration," "another configuration," "some configurations," "one or more configurations," "the subject technology," "the disclosure," "the present disclosure," and other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as "an aspect" or "some aspects" may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the terms "include," "have," or the like are used in the description or the claims, such terms are intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public, regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., hers and its) and vice versa. Headings and subheadings, if any, are used for convenience only and do not limit the subject disclosure.

What is claimed is:

1. A method for enhanced error protection using double-cyclic redundancy check (CRC), the method comprising:
    receiving a first packet, by a first physical layer (PHY), the first packet including a data packet and a first CRC;
    checking the first CRC, by an Ethernet media-access control (MAC) receive (RX) block of the first PHY;
    in response to no error detected subsequent to checking the first CRC, encrypting the first packet including the first CRC to generate an encrypted first packet;
    appending a second CRC to the encrypted first packet to produce a second packet;
    transmitting the second packet to a second PHY;
    receiving, by the second PHY, the second packet;
    checking, by the second PHY, whether the second packet is corrupted; and
    in response to the second PHY determining the second packet is not corrupted, removing, by the second PHY, the second CRC to retrieve the second packet.

2. The method of claim 1, further comprising retaining the first CRC.

3. The method of claim 2, further comprising encrypting the first packet by a MAC security (MACsec) block of the first PHY to generate the encrypted first packet.

4. The method of claim 3, further comprising appending, by an Ethernet MAC transmit (TX) block of the first PHY, the second CRC to the encrypted first packet to generate the second packet.

5. The method of claim 1, further comprising checking the second CRC, by a MAC RX block of the second PHY.

6. The method of claim 1, further comprising decrypting the encrypted first packet, by a MACsec block of the second PHY, to retrieve the first packet.

7. The method of claim 1, further comprising:
    removing, by the first PHY, the first CRC; and
    subsequent to removing the second CRC from the second packet:
        decrypting the second packet to produce a decrypted packet; and
        appending a third CRC to the decrypted packet to produce a third packet; and
        transmitting, by the second PHY, the third packet and the third CRC.

8. A system comprising:
    a first PHY coupled to a first switch; and
    a second PHY coupled to a second switch,
    wherein the first PHY is configured to:
        receive a packet from the first switch, the packet including a data packet and a first CRC, and
        in response to no error detected subsequent to checking the first CRC, retain the first CRC,
    transmit, without appending a second CRC, the packet to the second PHY via a transmission line; and
    wherein the second PHY is configured to:
        receive the packet;
        check whether the packet is corrupted; and
        in response to the second PHY determining the packet is not corrupted;
            retain the first CRC,
            remove the second CRC, and
            append a third CRC to the packet.

9. The system of claim 8, wherein the first PHY comprises an Ethernet MAC RX block configured to check the first CRC and retain the first CRC.

10. The system of claim 9, wherein the first PHY comprises a MACsec block configured to encrypt the packet to generate an encrypted packet.

11. The system of claim 10, wherein the first PHY comprises an Ethernet MAC TX block configured to transmit to the second PHY.

12. The system of claim 10 wherein the second PHY comprises a second Ethernet MAC RX block configured to check the encrypted packet.

13. The system of claim 12, wherein the second PHY comprises a second MACsec block configured to decrypt the encrypted packet to retrieve the packet.

14. The system of claim 13, wherein the second PHY comprises a second MAC TX block configured to transmit the retrieved packet to the second switch.

15. A system comprising:
a first PHY coupled to a first switch of a first line card; and
a second PHY coupled to a second switch of a second line card,
wherein the first PHY is configured to:
  receive a packet from the first switch, the packet including a data packet and a first CRC;
  check the first CRC;
  in response to the first PHY determining the first CRC does not contain a first error:
    remove the first CRC,
    append a second CRC to the packet, and
    encrypt the packet; and
  transmit the packet to the second PHY via a transmission line; and
wherein the second PHY is configured to:
  receive the transmitted packet;
  check the second CRC; and
  in response to the second PHY determining the second CRC does not contain a second error:
    remove the second CRC, and
    append a third CRC to the packet.

16. The system of claim 15, wherein the first PHY comprises a first Ethernet MAC RX block configured to check the first CRC to detect the first error.

17. The system of claim 16, wherein the second PHY comprises a second Ethernet MAC RX block configured to check the second CRC to detect the second error.

18. The system of claim 15, wherein the second PHY is configured to, when the second error is not detected by the second PHY:
  decrypt the packet, and
  append, subsequent to decrypting, the third CRC to the packet.

19. The system of claim 8, wherein the first PHY comprises a first MACsec block, and the first MACsec block is configurable to be disabled or bypassed.

20. The method of claim 1, further comprising:
  removing, by the first PHY, the first CRC; and
  subsequent to removing the second CRC from the second packet:
    decrypting the second packet to produce a decrypted packet; and
    appending a third CRC to the decrypted packet to produce a third packet; and
    transmitting, by the second PHY, the third packet and the third CRC.

* * * * *